(12) United States Patent
Sellinger

(10) Patent No.: US 10,183,420 B2
(45) Date of Patent: Jan. 22, 2019

(54) RESISTIVELY HEATED THERMOPLASTIC WASHOUT MANDREL

(71) Applicant: General Electric Company, Schenectady, NY (US)

(72) Inventor: Aaron Todd Sellinger, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 38 days.

(21) Appl. No.: 15/043,645

(22) Filed: Feb. 15, 2016

(65) Prior Publication Data

US 2017/0232644 A1 Aug. 17, 2017

(51) Int. Cl.
*B29C 35/02* (2006.01)
*B29C 53/02* (2006.01)
*B29C 71/00* (2006.01)

(52) U.S. Cl.
CPC .......... *B29C 35/02* (2013.01); *B29C 35/0272* (2013.01); *B29C 53/02* (2013.01); *B29C 71/0009* (2013.01); *B29C 2035/0211* (2013.01); *B29C 2071/0027* (2013.01)

(58) Field of Classification Search
CPC ............... B29C 35/02; B29C 33/3828; B29C 2049/4874; B29C 65/3488; B29C 66/73141; B29C 33/08; B29C 43/02; B29C 70/30; B29L 2031/00; H01B 1/12
USPC ................ 264/404, 402, 319, 314; 252/500; 138/123
See application file for complete search history.

(56) References Cited

U.S. PATENT DOCUMENTS

| | | | |
|---|---|---|---|
| 3,425,982 A | 2/1969 | Fink | |
| 3,736,979 A | 6/1973 | Krall | |
| 3,961,003 A | 6/1976 | Parsels | |
| 4,140,461 A * | 2/1979 | Wiley | ..................... B29C 33/08 425/174.6 |
| 4,154,291 A | 5/1979 | Nielsen | |
| 4,581,263 A | 4/1986 | Lukas | |
| 5,151,241 A * | 9/1992 | Maier | ................... B29B 13/024 264/314 |
| 5,259,901 A | 11/1993 | Davis | |
| 5,958,323 A * | 9/1999 | Mio | ..................... B29C 35/0805 249/115 |

(Continued)

FOREIGN PATENT DOCUMENTS

WO WO92/08594 5/1992

OTHER PUBLICATIONS

Definition of Polycarbonate—Wikipedia_published on Nov. 29, 2014.*

*Primary Examiner* — Matthew J Daniels
*Assistant Examiner* — Yunju Kim
(74) *Attorney, Agent, or Firm* — General Electric Company; Brian Overbeck

(57) ABSTRACT

The present disclosure is directed to a method of forming a composite component. The method includes laying one or more layers of uncured composite material onto a mandrel. The mandrel which includes a plurality of conductive media dispersed in a thermoplastic material. An electric current is supplied to the mandrel to resistively heat the one or more layers of uncured composite material to a temperature sufficient to cure the one or more layers of uncured composite material to form a cured composite component. The mandrel is removed from the cured composite component.

7 Claims, 9 Drawing Sheets

(56) References Cited

U.S. PATENT DOCUMENTS

| | | | |
|---|---|---|---|
| 6,458,309 B1 | 10/2002 | Allen | |
| 6,589,472 B1 | 7/2003 | Benson | |
| 6,828,373 B2 | 12/2004 | Ariz | |
| 8,118,974 B2 | 2/2012 | Nakai | |
| 8,387,683 B2 | 3/2013 | Yoshida | |
| 9,174,393 B2 | 11/2015 | Bartel | |
| 2004/0026828 A1* | 2/2004 | Seimetz | B29C 43/003 264/319 |
| 2007/0012900 A1* | 1/2007 | Callen | H01B 1/24 252/500 |
| 2010/0186899 A1 | 7/2010 | Jackson | |
| 2012/0260709 A1* | 10/2012 | Krajewski | B21D 22/025 72/57 |
| 2014/0102578 A1* | 4/2014 | Bartel | B29C 70/462 138/123 |
| 2015/0252675 A1 | 9/2015 | Radomski | |

* cited by examiner

RESISTIVELY HEATED THERMOPLASTIC WASHOUT MANDREL

FIELD OF THE INVENTION

The present disclosure generally relates to a method of forming a composite component and, more particularly, a method of forming a composite component using resistive heating.

BACKGROUND OF THE INVENTION

Many aircraft components (e.g., airfoils, ducts, panels, etc.) are typically constructed from composite materials such as polymeric matrix composites and ceramic matrix composites. Generally, such composite components are formed by placing uncured composite material into a mold or onto a mandrel having the desired shape of the finished composite component. The mold/mandrel and the uncured composite material are then placed into an oven or an autoclave, which heats the uncured composite material to a temperature sufficient for curing thereof.

Nevertheless, curing the uncured composite material in an oven or an autoclave is an expensive and time-consuming process. More specifically, the oven/autoclave takes a long time to reach the proper temperature before the uncured composite component may be placed therein. Similarly, the oven/autoclave also takes a long time to cool to a safe temperature before the cured composite component may be removed therefrom. This heating and cooling time greatly increases the cycle time necessary to make composite components using conventional methods. This increased cycle time increases the manufacturing cost of the composite component. Accordingly, a method of forming a composite component that does not require the use of an oven or an autoclave for curing thereof would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present disclosure is directed to a method of forming a composite component. The method includes laying one or more layers of uncured composite material onto a mandrel. The mandrel includes a plurality of conductive media dispersed in a thermoplastic material. An electric current is supplied to the mandrel to resistively heat the one or more layers of uncured composite material to a temperature sufficient to cure the one or more layers of uncured composite material to form a cured composite component. The mandrel is removed from the cured composite component.

In another aspect, the present disclosure is directed to a method of forming a composite component. The method includes laying one or more layers of uncured composite material onto a mandrel. The mandrel includes a plurality of conductive media dispersed in a thermoplastic material. The thermoplastic material of the mandrel has a glass transition temperature. The uncured composite material has a glass transition temperature. An electric current is supplied to the mandrel to resistively heat the mandrel and the one or more layers of uncured composite material to a temperature above both the glass transition temperature of thermoplastic material of the mandrel and the glass transition temperature of the uncured composite material. The mandrel and the uncured composite material are deformed from a first shape to a second shape. The mandrel is removed from the composite component.

In a further aspect, the present disclosure is directed to a method of forming a thermoplastic component. The method includes laying one or more layers of thermoplastic material onto a mandrel. The mandrel includes a plurality of conductive media dispersed therein, and the one or more layers of thermoplastic material have a glass transition temperature. An electric current is supplied to the mandrel to resistively heat the one or more layers of thermoplastic material to a temperature above the glass transition temperature of the one or more layers of thermoplastic material. The one or more layers of thermoplastic material are allowed to deform from a first shape to a second shape to form a final thermoplastic component. The mandrel is removed from the final thermoplastic component.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended Figs., in which.

Figure 1A:
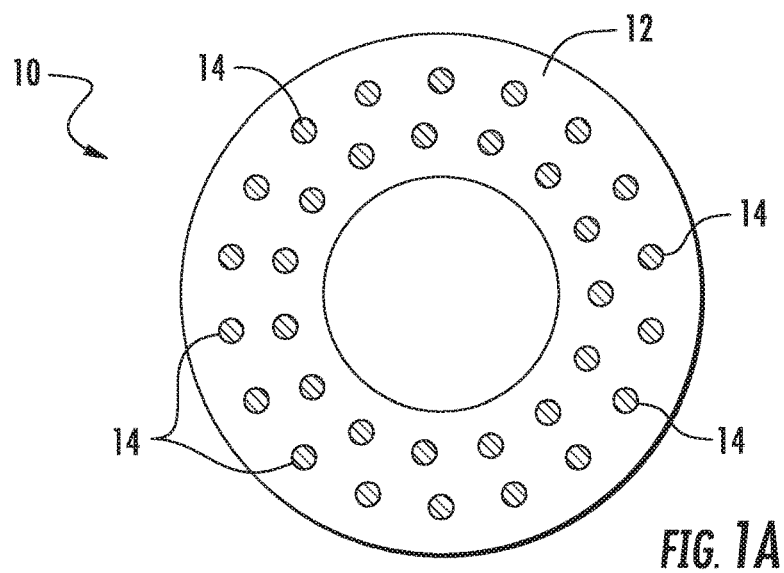
FIG. 1A is a schematic view an exemplary mandrel, illustrating a plurality of conductive media dispersed in a thermoplastic material.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

As used herein, the term "polymer" generally includes, but is not limited to, homopolymers; copolymers, such as, for example, block, graft, random and alternating copolymers; and terpolymers; and blends and modifications thereof. Furthermore, unless otherwise specifically limited, the term "polymer" shall include all possible geometrical configurations of the material. These configurations include, but are not limited to isotactic, syndiotactic, and random symmetries.

The term "thermoplastic" is used herein to mean any material formed from a polymer which softens and flows when heated; such a polymer may be heated and softened a number of times without suffering any basic alteration in characteristics, provided heating is below the decomposition temperature of the polymer. Examples of thermoplastic polymers include, by way of illustration only, polyolefins, polyesters, polyamides, polyurethanes, acrylic ester polymers and copolymers, polyvinyl chloride, polyvinyl acetate, etc. and copolymers thereof.

As used herein, the prefix "nano" refers to the nanometer scale (e.g., from about 1 nm to about 999 nm). For example, particles having an average diameter on the nanometer scale (e.g., from about 1 nm to about 999 nm) are referred to as "nanoparticles".

In the present disclosure, when a layer is being described as "on" or "over" another layer or a mandrel, it is to be understood that the layers can either be directly contacting each other or have another layer or feature between the layers, unless expressly stated to the contrary. Thus, these terms are simply describing the relative position of the layers to each other and do not necessarily mean "on top of" since the relative position above or below depends upon the orientation of the device to the viewer.

The methods of forming a composite component disclosed herein include laying one or more layers of uncured composite material onto a mandrel. The mandrel is formed from a thermoplastic material having a plurality of conductive media dispersed therein. An electric current is supplied to the mandrel to resistively heats the one or more layers of uncured composite material to a temperature sufficient for curing thereof. In this respect, the methods disclosed herein do not require the use of an oven or autoclave for curing, thereby reducing the cycle time and the manufacturing cost of producing the composite components compared to conventional methods.

Figure 1B:
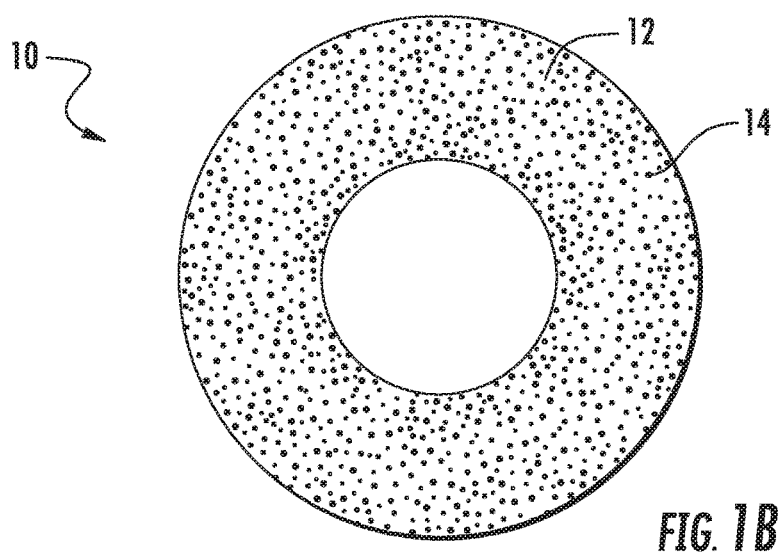
FIG. 1B is a schematic view another exemplary mandrel, illustrating a plurality of conductive media dispersed in a thermoplastic material.

FIGS. 1A-1B illustrates embodiments of a mandrel 10 for use in forming a composite component. More specifically, the mandrel 10 includes a thermoplastic material 12 having a plurality of conductive media 14 dispersed therein. In some embodiments, the thermoplastic material 12 is a polycarbonate. Nevertheless, the thermoplastic material 12 may be any suitable thermoplastic. As shown in FIG. 1A, the plurality of conductive media 14 may be macroscopic particles or inclusions randomly dispersed in the thermoplastic material 12. Alternatively, the plurality of conductive media 14 may be microscopic particles or inclusions randomly dispersed in the thermoplastic material 12 as shown in FIG. 1B. For example, the plurality of conductive media 14 may be carbon black inclusions, carbon nanotubes, metallic nanowires, or any other suitable material. In the embodiments shown in FIGS. 1A-1B, for example, the mandrel 10 may have an annular shape for forming a tube-like component. Although, the mandrel 10 may have any suitable shape (e.g., curved, etc.) for forming the desired composite component.

The thermoplastic material 12 and the plurality of conductive media 14 each have a respective glass transition ("$T_g$") temperature. As used herein, "glass transition temperature" or "$T_g$" refers to the temperature at which an amorphous polymer or an amorphous portion of a crystalline polymer transitions from a hard and brittle glassy state to a rubbery state. For example, the $T_g$ may be determined by dynamic mechanical analysis (DMA) in accordance with ASTM E1640-09. A Q800 instrument from TA Instruments may be used. The experimental runs may be executed in tension/tension geometry, in a temperature sweep mode in the range from −120° C. to 150° C. with a heating rate of 3° C./min. The strain amplitude frequency may be kept constant (2 Hz) during the test. Three (3) independent samples may be tested to get an average $T_g$, which is defined by the peak value of the tan δ curve, wherein tan δ is defined as the ratio of the loss modulus to the storage modulus (tan δ==E"/E').

The plurality of conductive media 14 is present in the thermoplastic material 12 in a concentration that exceeds a percolation threshold. The "percolation threshold" as used herein refers to a concentration of a conductive component (e.g., the plurality of conductive media 14) in a dielectric material (e.g., the thermoplastic material 12) that permits the conduction of electricity therethrough. When above the percolation threshold, the plurality of conductive media 14 conducts electricity through the thermoplastic material 12. Below the percolation threshold, however, the plurality of conductive media 14 is unable to conduct electricity through the thermoplastic material 12.

Figure 2:
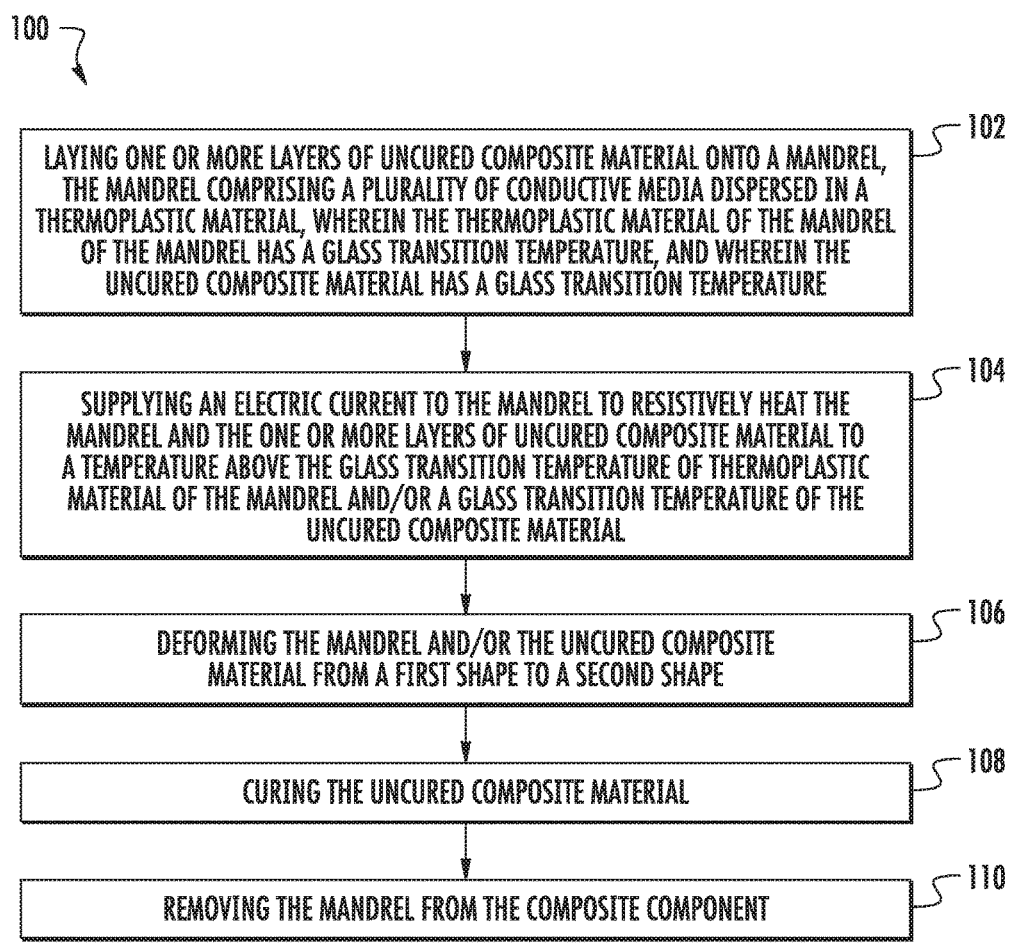
FIG. 2 is a flow chart illustrating an exemplary method of forming a composite component in accordance with the embodiments disclosed herein.

FIG. 2 is a flow chart illustrating an exemplary method (100) of forming a composite component in accordance with the embodiments disclosed herein. FIGS. 3-8 illustrate various aspects of the method (100).

Figure 3A:
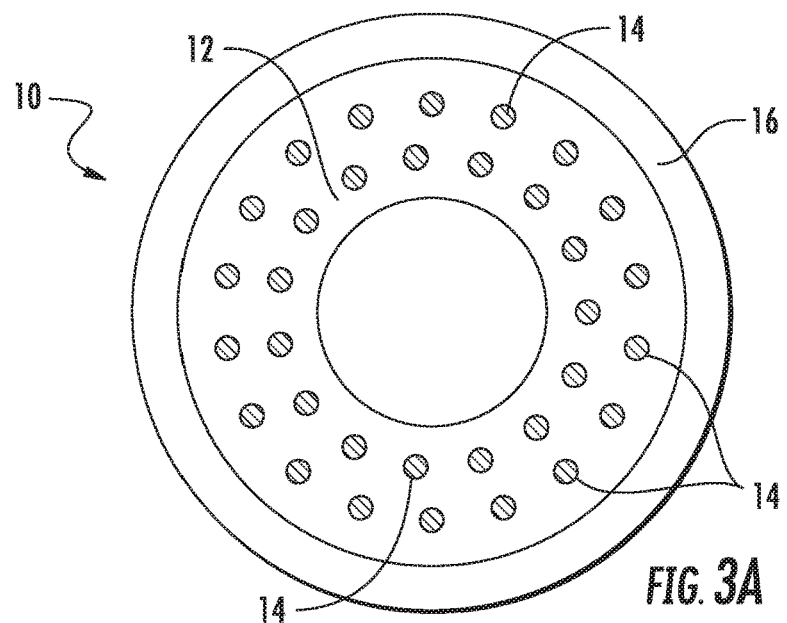
FIG. 3A is a schematic view of the mandrel shown in FIG. 1A, illustrating one or more layers of uncured composite material laid thereon.
Figure 3B:
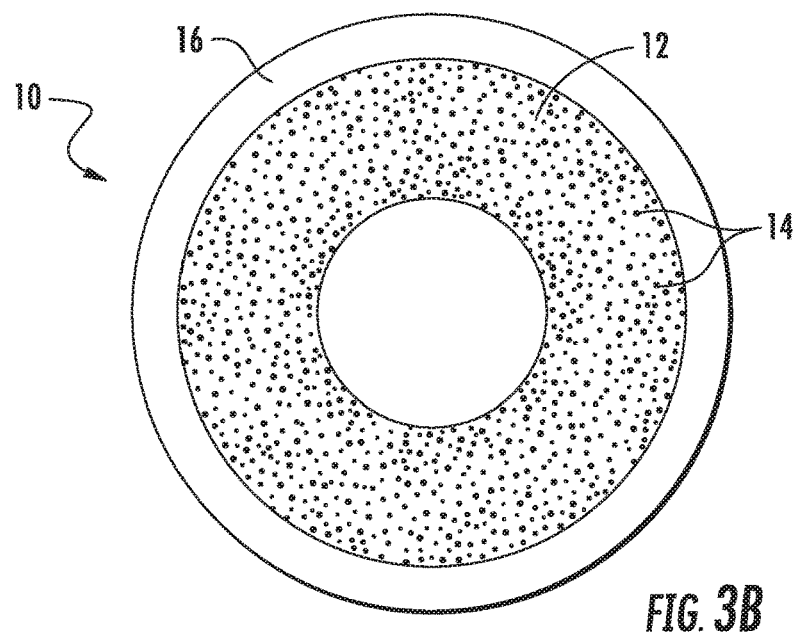
FIG. 3B is a schematic view of the mandrel shown in FIG. 1B, illustrating one or more layers of uncured composite material laid thereon.

Referring to FIGS. 2, 3A, and 3B, one or more layers of uncured composite material 16 (e.g., an uncured composite tape) are laid onto mandrel 10 in (102). In the embodiment shown in FIGS. 3A-3B, for example, the one or more layers of uncured composite material 16 are wrapped around the mandrel 10 to form a tube-like shape. FIG. 3A shows the one or more layers of uncured composite material 16 are wrapped around the mandrel 10 when the plurality of conductive media 14 is macroscopic. FIG. 3B conversely shows the one or more layers of uncured composite material 16 are wrapped around the mandrel 10 when the plurality of conductive media 14 is microscopic. In other embodiments, however, the one or more layers of uncured composite material 16 may be placed on the mandrel 10 to form other shapes as well based on the particular shape of the mandrel 10.

The one or more layers of uncured composite material may be selected from the group consisting of, but not limited to, a ceramic matrix composite ("CMC"), a polymer matrix composite ("PMC"), a metal matrix composite ("MMC"), or a combination thereof. Suitable examples of matrix material for a CMC matrix is ceramic powder, including but not limited to, silicon carbide, aluminum-oxide, silicon oxide, and combinations thereof. Suitable examples of matrix material for a PMC include, but are not limited to, epoxy based matrices, polyester based matrices, and combinations thereof. In particular embodiments, the PMC material may be thermoplastic PMC tape having a polyether ether ketone ("PEEK") matrix. Suitable examples of a MMC matrix material include, but are not limited to powder metals such as, but not limited to, aluminum or titanium that are capable of being melted into a continuous molten liquid metal which can encapsulate fibers present in the assembly, before being cooled into a solid ingot with incased fibers. The resulting MMC is a metal article with increased stiffness, and the metal portion (matrix) is the primary load caring element.

Figure 4:
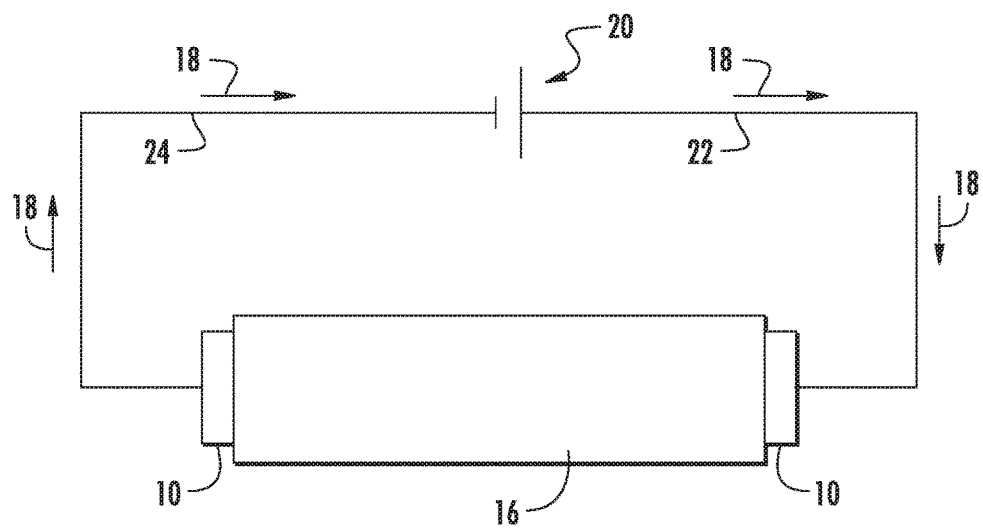
FIG. 4 is a schematic view of an exemplary mandrel, such as shown in FIGS. 3A and 3B, illustrating a power supply for supplying electric current to the mandrel.
Figure 5:
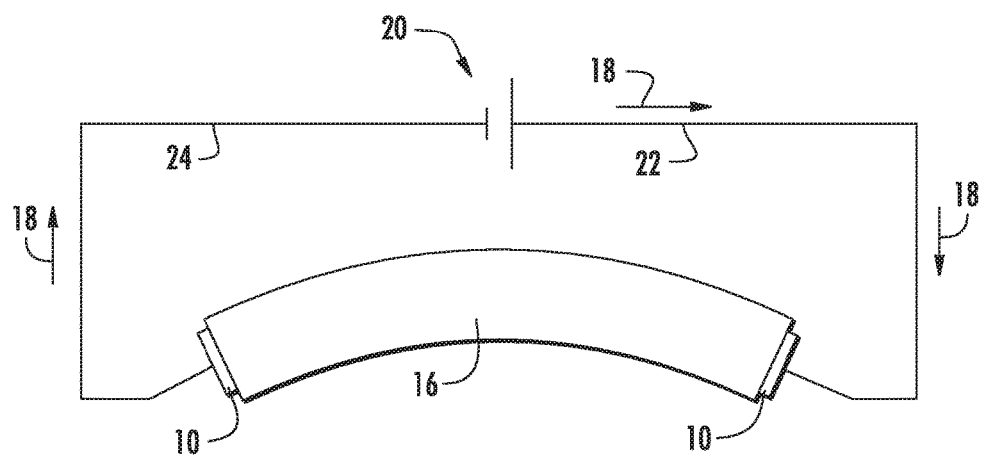
FIG. 5 is a schematic view of an exemplary mandrel, such as shown in FIGS. 3A and 3B, illustrating a power supply for supplying electric current to the mandrel after heating and deformation thereof.

Referring now to FIGS. 2 and 4, an electric current 18 is supplied to the mandrel 10 to resistively heat the mandrel 10 and the one or more layers of uncured composite material 16 to a temperature above the $T_g$ of the one or more layers of uncured composite material 16 in (104). (104) may also include resistively heating the mandrel 10 and the one or more layers of uncured composite material 16 to a temperature above the $T_g$ of thermoplastic material 12 of the mandrel 10. In some embodiments, however, the mandrel 10 and the one or more layers of uncured composite material 16 are heated to a temperature below the $T_g$ of the thermoplastic material 12 of the mandrel 10.

More specifically with respect to (104), a power supply 20 (e.g., a power grid, an electrical outlet, a battery, etc.) supplies the electric current 18 to the mandrel 10 via a first wire 22. The plurality of conductive media 14 then conducts the electric current 18 through the mandrel 10. A second wire 24 returns the electric current 18 to the power supply 20 or a ground (not shown). The internal resistance of the plurality of conductive media 14 creates a voltage drop across the mandrel 10, thereby creating heat. This resistive heating increases the temperature of the mandrel 10, which, in turn, increases the temperature of the one or more layers of uncured composite material 16.

As mentioned above, the resistive heating may increase the temperature of the one or more layers of uncured composite material 16 above its $T_g$. At such temperatures (i.e., above the $T_g$ of the thermoplastic material 12 of the mandrel 10 and above the $T_g$ of the one or more layers of uncured composite material 16), the mandrel 10 and the uncured composite material 16 may be manipulated to a desired shape. In this respect, the mandrel 10 and the uncured composite material 16 may be deformed from a first shape (e.g., the shape shown in FIG. 4) to a second shape (e.g., the shape shown in FIG. 5) in (106). For example, the mandrel 10 and the uncured composite material 16 can be curved, bent, or otherwise deformed as desired. Such an optional deformation process is shown through bending of the mandrel 10 and the uncured composite material 16 in FIG. 5 prior to removing the mandrel 10.

In (108), the one or more layers of uncured composite material 16 are cured. More specifically, heating the one or more layers of uncured composite material 16 to a temperature above the $T_g$ thereof may be sufficient for curing thereof. In one embodiment, the resistive heating can be performed for a sufficient period of time (e.g., 5 minutes to 30 minutes) such that the one or more layers of uncured composite material 16 attain the temperature sufficient for curing thereof. As such, the one or more layers of uncured composite material 16 are transformed into a cured composite component 26. In some embodiments, the electric current 18 may be 10 Amps to 50 Amps, and the voltage drop may be 50 Volts to 100 Volts. Although, the electric current 18 and/or the voltage drop may be different in other embodiments.

Curing may be accomplished by any suitable method. For PMCs, curing activates or consolidates the matrix material of the whole assembled ply stack. Curing is accomplished by thermal activation of matrix media, usually, resins or polymers used to coat the fibers forming a thermoplastic with fiber encapsulation also known as thermosetting. For MMCs, curing is accomplished through melting of the matrix media, usually, powder metal used to coat the fibers into metallic slurry with fibers present, and then cooled to a continuous metallic with encapsulated fibers when cooled. The metal matrix media includes, but is not limited to, lighter metals such as aluminum, magnesium, or titanium. For CMCs, curing is accomplished by thermal activation of the binder followed by pyrolyzing the binder to form carbon deposits, to encapsulate or bond together the fibers. The encapsulated or bonded fibers are cooled.

Figure 6:
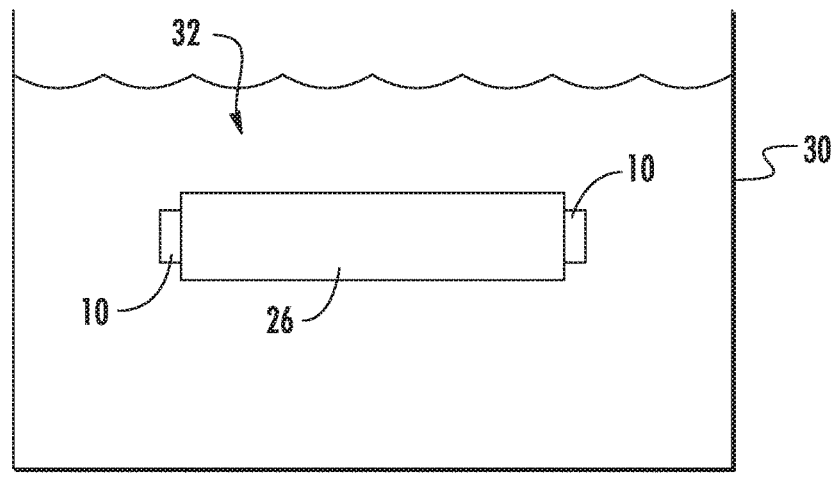
FIG. 6 is a schematic view of a tank containing a solvent, illustrating an exemplary mandrel, such as shown in FIGS. 3A and 3B, and a cured composite component submerged therein.
Figure 7:
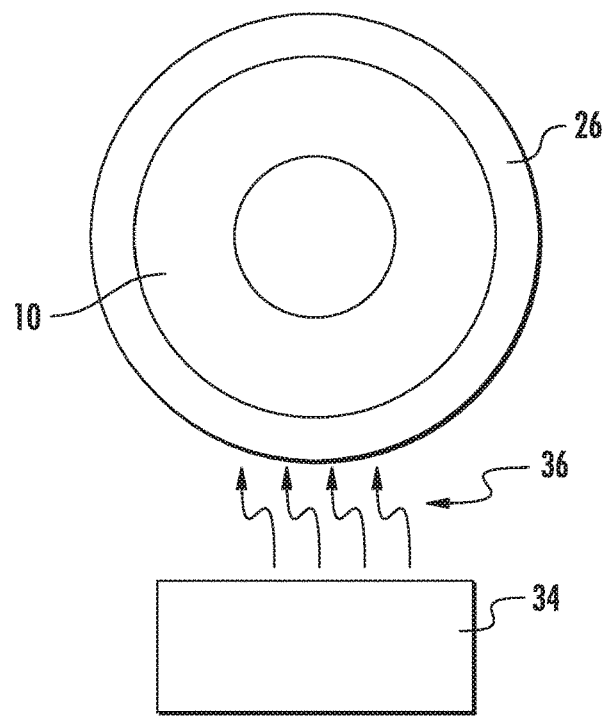
FIG. 7 is a schematic view of an exemplary mandrel, such as shown in FIGS. 3A and 3B and the cured composite component, illustrating an external heater supplying heat thereto.
Figure 8A:
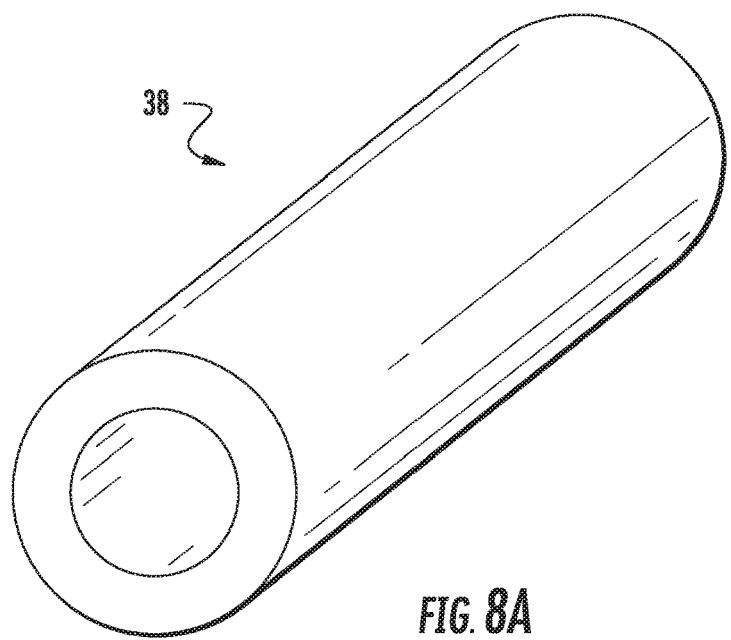
FIG. 8A is a perspective view of a tube formed in accordance with the embodiments disclosed herein.
Figure 8B:
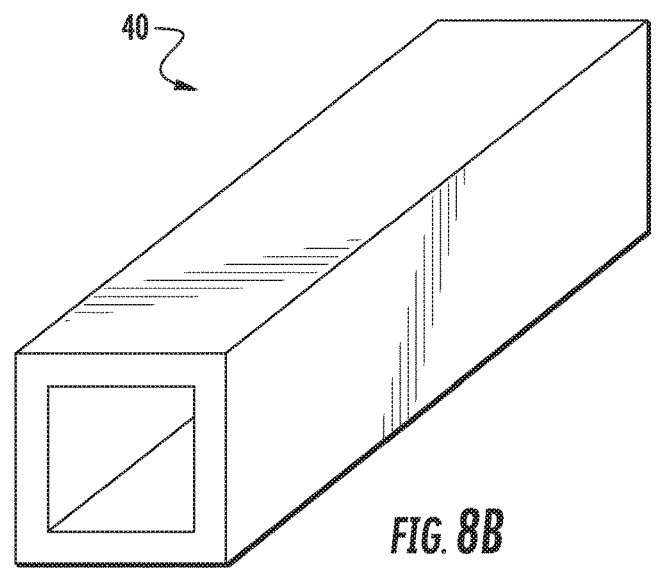
FIG. 8B is a perspective view of a duct having a rectangular cross-section formed in accordance with the embodiments disclosed herein.
Figure 8C:
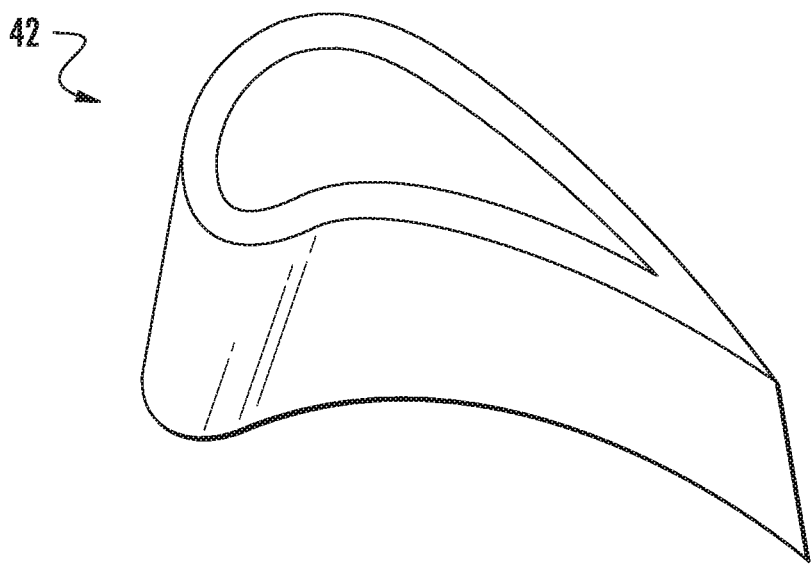
FIG. 8C is a perspective view of an airfoil formed in accordance with the embodiments disclosed herein.
Figure 8D:
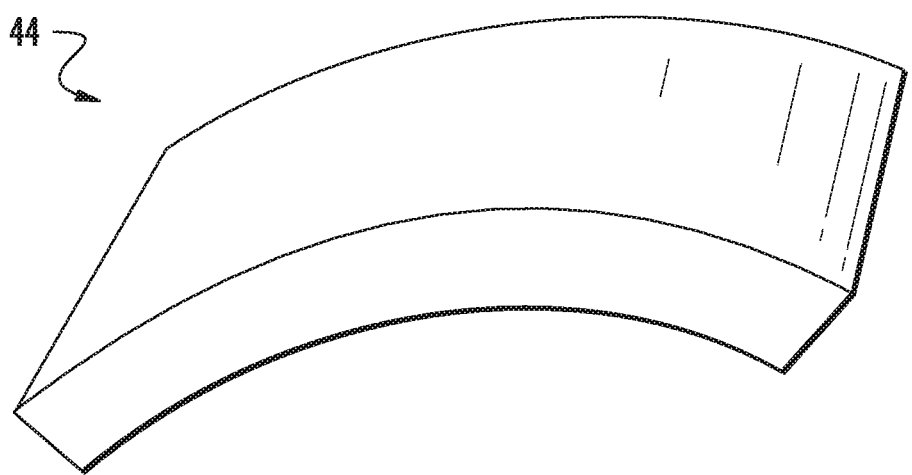
FIG. 8D is a perspective view of a curved panel produced in accordance with the embodiments disclosed herein.

Referring now to FIGS. 2 and 6-7, the mandrel 10 is removed from the cured composite component 26 in (110). In the embodiment shown in FIG. 6, the mandrel 10 and the cured composite component 26 are submerged in a tank 30 filled with a solvent 32. In this respect, the solvent 32 selectively dissolves the thermoplastic material 12 of the mandrel 10, while leaving the cured composite component 26 intact. As such, only the cured composite component 26 remains upon completion of (110). In one embodiment, the solvent 32 is acetone; although, the solvent 32 may be any suitable material. For example, in an embodiment where the solvent 32 is acetone, the thermoplastic material 12 of the mandrel 10 may be a polycarbonate and the cured composite component 26 may include a PEEK matrix as mentioned above. When dipped in the tank 30, the acetone dissolves the polycarbonate of the mandrel 10, while leaving the PEEK matrix of the cured composite component 26 intact.

In alternate embodiments, the mandrel 10 may be removed from the cured composite component 26 via heating. As is more specifically illustrated in FIG. 7, an external heater 34 supplies heat 36 to soften the mandrel 10. Once softened, the mandrel 10 may be removed from the cured composite component 26. The heat 36 may also thermally decompose the mandrel 10 as well. In further embodiments, the heat 36 necessary to soften the mandrel 10 may be supplied by the internal resistance of the plurality of conductive media 14.

FIGS. 8A-8D illustrate various embodiments of the cured composite component 26. Specifically, FIGS. 8A-8D respectively illustrate a tube 38, a duct 40 having a rectangular cross-section, an airfoil 42, and a curved panel 44. Nevertheless, the cured composite component 26 may have any suitable form or shape and may be any type of component. In one embodiment, the cured composite component 26 is an aircraft component (e.g., the airfoil 42). Although, the cured composite component 26 may be a component for use in any suitable application. For example, the cured composite component 26 can be utilized as a component within a gas turbine engine.

Figure 9:
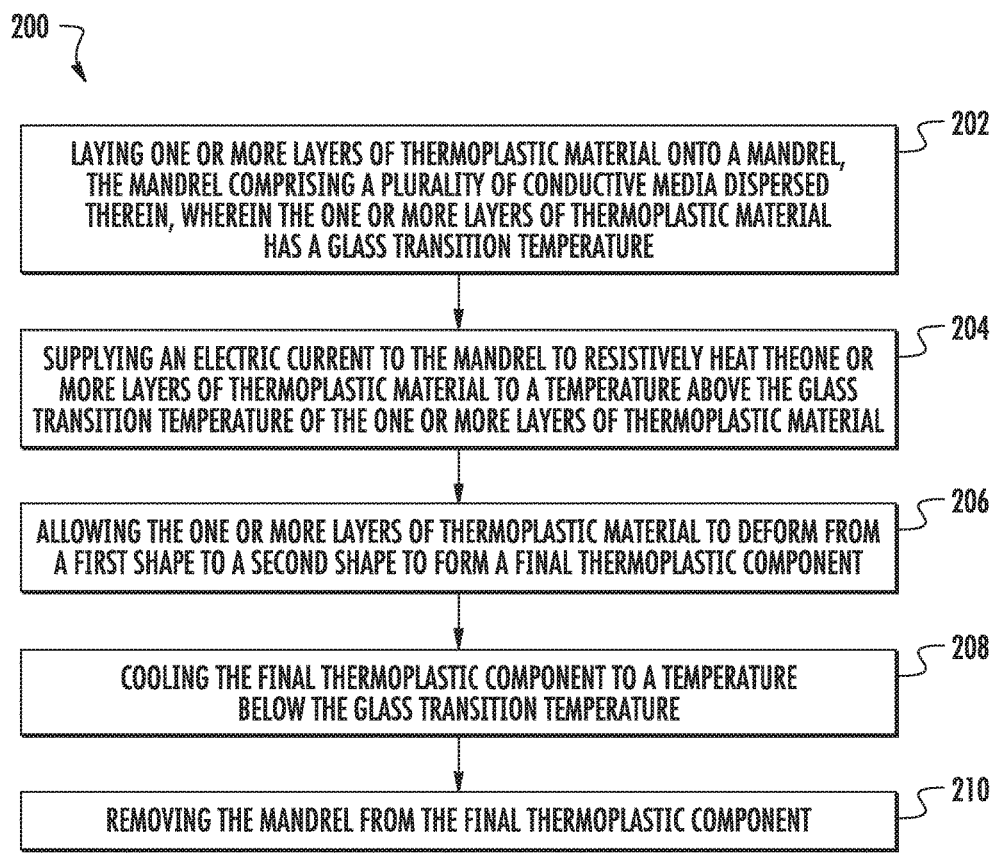
FIG. 9 is a flow chart illustrating an exemplary method of forming a thermoplastic component in accordance with the embodiments disclosed herein.
Figure 10:
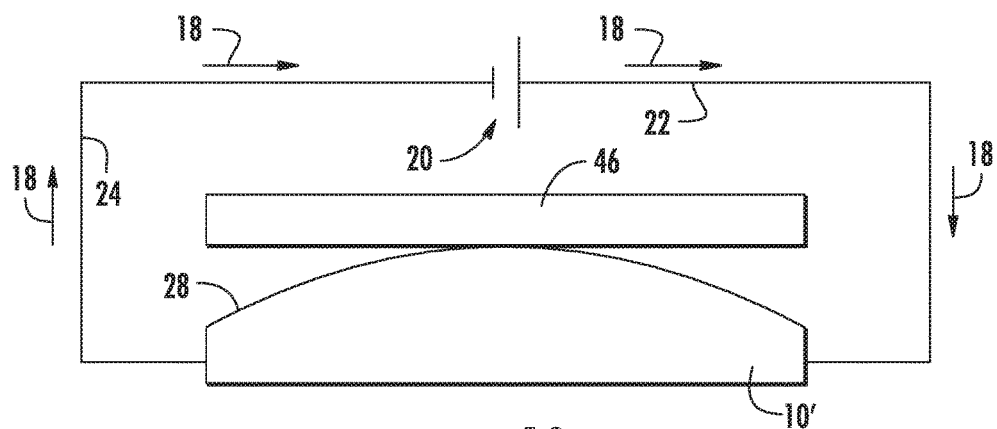
FIG. 10 is a schematic view of an alternate embodiment of the mandrel, illustrating the one or more layers of thermoplastic material placed on a curved surface of the mandrel.
Figure 11:
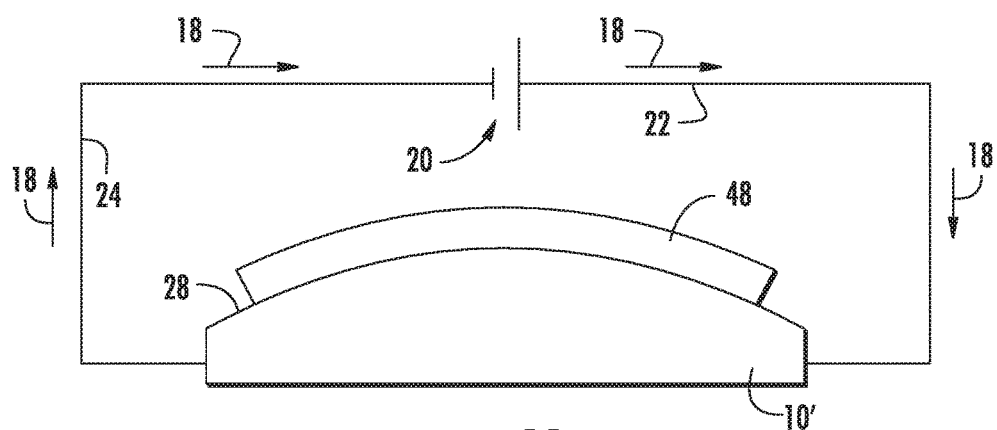
FIG. 11 is a schematic view of the embodiment of the mandrel shown in FIG. 10, illustrating a shape of the one or more layers of thermoplastic material after deformation thereof by resistive heating.

The mandrel 10 may also be useful in forming thermoplastic components via thermoforming. In this respect, FIG. 9 is a flow chart illustrating an exemplary method (200) of forming a thermoplastic component in accordance with the embodiments disclosed herein. FIGS. 10 and 11 illustrate various aspects of the method (200).

Referring to FIGS. 8 and 9, one or more layers of thermoplastic material 46 onto an alternate embodiment of the mandrel 10' in (202). As shown in FIG. 9, the one or more layers of thermoplastic material 46 do not conform to the mandrel 10' upon completion of (202). That is, the mandrel 10' includes a curved surface 28, while the one or more layers of thermoplastic material 46 are planar. In this respect, the mandrel 10' may be used to form a curved thermoplastic component. Nevertheless, the mandrel 10, 10' may have any suitable shape for forming any suitable component. (202) is substantially similar to (102).

In (204), an electric current 18 is supplied to the mandrel 10 to resistively heat the mandrel 10 and the one or more layers of thermoplastic material 46 to a temperature above a $T_g$ of the one or more layers of thermoplastic material 46. (204) is substantially similar to (104).

In (206), the one or more layers of thermoplastic material 46 are deformed from a first shape (e.g., the shape shown in FIG. 10) to a second shape (e.g., the shape shown in FIG. 11), thereby forming a final thermoplastic component 48. That is, the one or more layers of thermoplastic material 46 deform when heated to a temperature above the $T_g$ thereof. This deformation converts the one or more layers of thermoplastic material 46 into a final thermoplastic component 48 as shown in FIG. 11. The final thermoplastic component 48 is cooled in (208) to a temperature below the $T_g$ thereof. The final thermoplastic component 48 may be any of the components shown in FIGS. 8A-8D or any other suitable component.

In (210), the mandrel 10' is removed from the final thermoplastic component 48. (210) may be performed in the same manner (e.g., dissolution, heating, etc.) as (110).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of forming a composite component, comprising:
    laying one or more layers of uncured composite material onto a mandrel, the mandrel comprising a plurality of conductive media dispersed in a thermoplastic material, wherein the thermoplastic material of the mandrel has a glass transition temperature, and wherein the uncured composite material has a glass transition temperature;
    supplying an electric current to the mandrel to resistively heat the mandrel and the one or more layers of uncured composite material to a temperature above both the glass transition temperature of thermoplastic material of the mandrel and the glass transition temperature of the uncured composite material;
    deforming the mandrel and the uncured composite material from a first shape to a second shape;
    curing the uncured composite material; and
    removing the mandrel from the composite component.

2. The method of claim 1, wherein the cured composite material remains in the second shape after curing and removing the mandrel.

3. The method of claim 1, wherein removing the mandrel comprises dissolving the mandrel with a solvent.

4. The method of claim 3, wherein the solvent comprises acetone, the thermoplastic material of the mandrel comprises polycarbonate, and the one or more layers of uncured composite tape comprise polyether ether ketone.

5. The method of claim 1, wherein the plurality of conductive media comprise carbon black or carbon nanotubes.

6. The method of claim 1, wherein the one or more layers of uncured composite tape comprise a thermoplastic polymeric matrix composite tape.

7. The method of claim 1, wherein the cured composite component is a tube, a duct, an airfoil, or a curved panel.

* * * * *